July 7, 1931.  W. T. POWERS  1,813,637
SEPARATOR
Filed Sept. 20, 1927
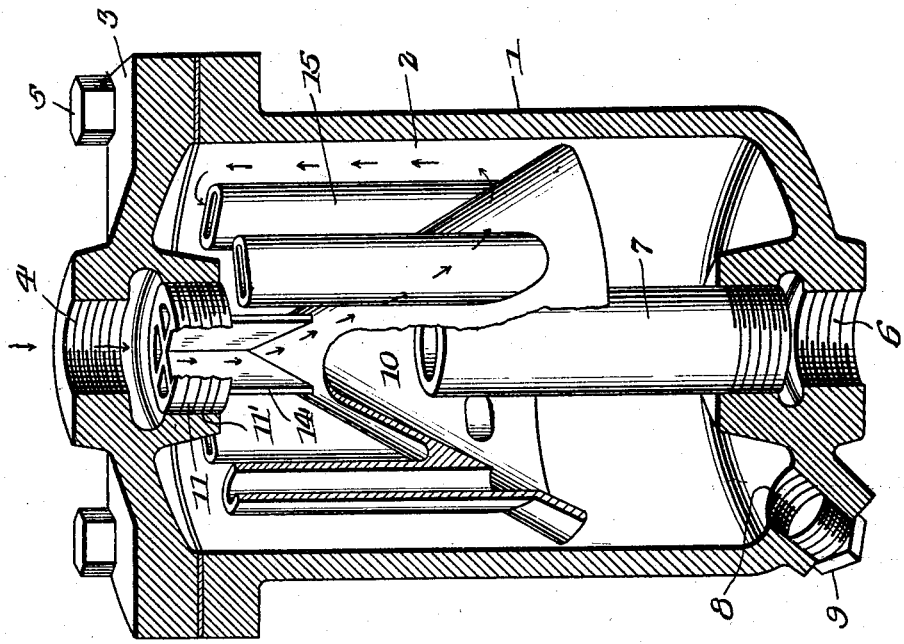
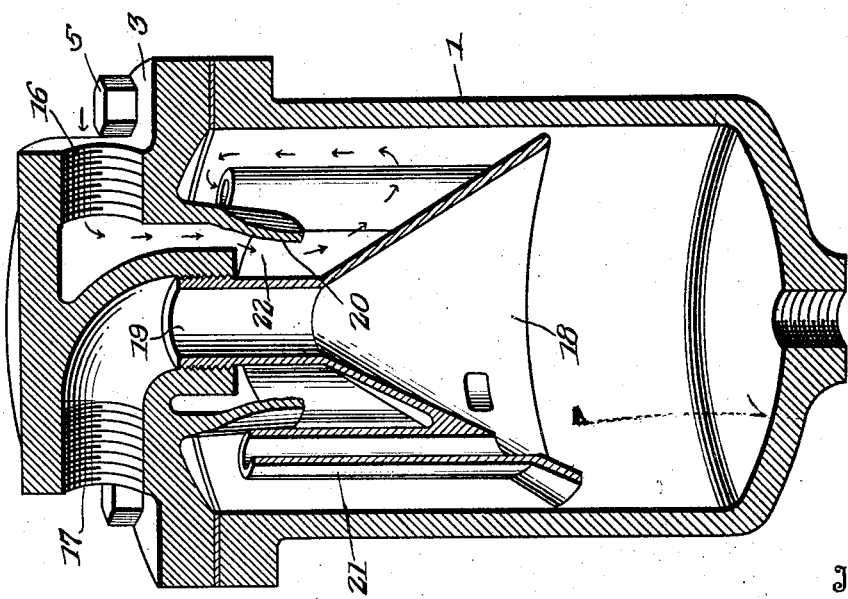
Inventor
William T. Powers
By Parsons & Bodell
Attorney Patented July 7, 1931

1,813,637

UNITED STATES PATENT OFFICE

WILLIAM T. POWERS, OF SYRACUSE, NEW YORK, ASSIGNOR TO THE DIRECT SEPARATOR COMPANY INC., OF SYRACUSE, NEW YORK, A CORPORATION OF NEW YORK

SEPARATOR

Application filed September 20, 1927. Serial No. 220,668.

This invention has for its object a separator particularly adapted for separating water from gas as compressed air which separator is particularly simple and economical in structure and highly efficient and durable in use. It is particularly adapted for use between a source of supply of compressed air and the tool or tools to which the compressed air is supplied for the purpose of operating them.

This invention consists in the novel features and in the combinations and constructions hereinafter set forth and claimed.

In describing this invention, reference is had to the accompanying drawings in which like characters designate corresponding parts in all the views.

Figure 1 is a vertical perspective sectional view of one form of this separator.

Figure 2 is a similar view of another form.

This separator comprises, generally, a body which incloses a separator chamber, the body having spaced apart inlet and outlet, a separator member having an inclined surface presented toward the inlet and tubular passages projecting from the inclined surface in a general direction toward the inlet and being open at their free ends and opening at their other ends through the separator member to the outlet side thereof. The edge of the separator member toward the outlet, terminates close to but is spaced apart from the wall of the chamber.

In the illustrating embodiment of my invention, the separator member is in the form of a hollow cone arranged with its apex and outer conical surface toward the inlet and with its base spaced apart from the wall of the separator chamber.

1 designates the body formed with the separator chamber 2, the body having a detachable head 3 formed with an inlet passage 4, this passage 4 being threaded for receiving a conduit leading to a source of supply. The head is held in position by screws 5.

6 designates the outlet which is in Figure 1, shown at the bottom of the chamber 2 beneath the cone and a pipe 7 threads into the outlet and extends up into the hollow cone. The outlet is also formed with threads for connection to an outlet conduit leading to the tool using the air. The bottom part of this chamber forms a trap for the water and is provided with an outlet opening 8 normally closed by a plug 9.

10 designates the separator member in the form of a hollow cone, this member having a hollow threaded nipple 11 at its upper end which threads into a passage 11' on the inner side of the head 3 in line with the inlet opening 4, the nipple being connected to the cone by webs 14 which permit the air, after passing through the nipple to strike the conical surface of the separator. 15 are tubes rising from the conical separator toward the inlet or upper end of the chamber and being open at their free ends and opening at their lower ends to the interior of the cone.

In Figure 2 the inlet 16 and the outlet 17 are both located at the upper end or in the head of the separator member and the conical separator 18 is formed with a tubular extension 19 at its apex threading into the outlet passage in the head. The lower end of the chamber forms a trap for the water as in Figure 1. Also a circular partition 20 depends from the head toward the conical separator member 18 between the upper ends of the tubes 21 and the conical member 18. This partition together with the upper portion of the body 1 and the head forms an annular passage 22 directed toward the upper conical surface of the separator member which passage communicates with the inlet 16.

In the constructions shown in Figures 1 and 2, the separator is carried by the head and is a unit therewith. In the operation of the separator shown in Figure 1, the air enters the inlet 4, strikes the conical separator member 10 where the water is separated from the greater part of the air. The air then passes upwardly and down through the tubes 15 to the interior of the conical separator member thence out through the outlet pipe. The greater part of air passes upwardly because it is deflected laterally by the upper surface of the conical separator 10 and strikes the side walls of the body at such an angle that it passes upwardly toward the head 3. The water flows down the conical surface over the edge thereof to the lower part of the chamber 2.

In the form shown in Figure 2, the air enters the inlet 16, passes through the annular passage 22 formed by the partition 20, thence strikes the conical separator member 18, separating the water therefrom, which runs down into the trap into the lower end of the chamber. The air passing upwardly and thence downwardly through the tubes to the interior of the conical separator member 18 and thence out through the outlet 17.

In both constructions the separator member is a unit with a head and removable therewith.

What I claim is:

1. A seperator of the class described comprising a chamber having an inlet passage and an outlet passage, a funnel shaped element mounted within the chamber and having its tubular end connected to the outlet passage and so arranged relative to the inlet passage that gas entering through the same strikes the outer inclined side of said element, said element having passages in its inclined side near the base thereof and tubular members extending from said passages toward the inlet passage and parallel with the axis of said funnel shaped element.

2. A separator of the class described comprising a body forming a chamber, the body having an inlet passage and an outlet passage, a funnel shaped member mounted within the chamber and having its tubular end connected to the outlet passage, said member having passages through its inclined side near the base thereof, tubular members extending from said passages in a general direction towards the apex of said member and parallel with the axis thereof, the body also having a cylindrical flange concentric with the tubular end of the funnel shaped element and being located between said tubular end and the tubes extending from the aforesaid passages, the inlet passage opening between the cylindrical flange and the tubular end of the funnel shaped element.

3. A separator of the class described comprising a chamber having an inlet passage and an outlet passage, a conical member mounted within said chamber and having a passage through the apex thereof, said passage opening into the outlet passage, said member also having passages through its inclined side near the base thereof and conduits connecting with said passages and extending in a direction toward the apex of said member.

In testimony whereof, I have hereunto signed my name, at Syracuse, in the county of Onondaga, and State of New York, this 17th day of Sept. 1927.

WILLIAM T. POWERS.